United States Patent
Drewes et al.

(10) Patent No.: US 7,895,255 B2
(45) Date of Patent: Feb. 22, 2011

(54) METHOD AND APPARATUS FOR PERFORMING A MULTIPLICATION OR DIVISION OPERATION IN AN ELECTRONIC CIRCUIT

(75) Inventors: Christian Drewes, Germering (DE); Ernst Bodenstorfer, Brunn am Gebirge (AT); Jürgen Niederholz, Kerken (DE)

(73) Assignee: Infineon Technologies AG, Neubiberg (DE)

( * ) Notice: Subject to any disclaimer, the term of this patent is extended or adjusted under 35 U.S.C. 154(b) by 1113 days.

(21) Appl. No.: 11/289,835

(22) Filed: Nov. 30, 2005

(65) Prior Publication Data

US 2006/0143261 A1 Jun. 29, 2006

(30) Foreign Application Priority Data

Dec. 14, 2004 (DE) ........................ 10 2004 060 185

(51) Int. Cl.
*G06F 7/52* (2006.01)
(52) U.S. Cl. ................... 708/625; 708/208; 708/650
(58) Field of Classification Search ................ 708/620, 708/625, 650, 653
See application file for complete search history.

(56) References Cited

U.S. PATENT DOCUMENTS

| | | | | |
|---|---|---|---|---|
| 4,507,676 A | | 3/1985 | Dischert et al. | |
| 5,020,017 A | * | 5/1991 | Ooms et al. | 708/650 |
| 7,127,483 B2 | * | 10/2006 | Beaumont-Smith et al. | 708/504 |
| 2003/0131037 A1 | | 7/2003 | Freidhof | |
| 2003/0195914 A1 | * | 10/2003 | Whikehart et al. | 708/625 |
| 2004/0186871 A1 | | 9/2004 | Ettorre et al. | |
| 2006/0179102 A1 | * | 8/2006 | Carlough et al. | 708/651 |

FOREIGN PATENT DOCUMENTS

| | | |
|---|---|---|
| DE | 100 09 451 C1 | 5/2001 |
| EP | 0 256 455 A1 | 2/1988 |
| EP | 0 795 818 A1 | 9/1997 |
| JP | 2003-263423 | 9/2003 |
| JP | 2003-316567 | 11/2003 |

OTHER PUBLICATIONS

"3$^{rd}$ Generation Partnership Project; Technical Specification Group Radio Access Network; Physical channels and mapping of transport channels onto physical channels (FDD) (Release 4)", 3GPP TS 25.211, V4.6.0 (Sep. 2002), 46 pgs.

* cited by examiner

*Primary Examiner*—Chuong D Ngo
(74) *Attorney, Agent, or Firm*—Eschweiler & Associates, LLC

(57) ABSTRACT

A multiplication or division operation $X \cdot K$ or $X \cdot 1/K$ is performed in an electronic circuit. A software circuit area of the circuit calculates a digit shift sv such that $p^{sv}$ is an approximate value for K. In a hardware circuit area, the value X is shifted sv digits to the left in the case of multiplication or sv digits to the right in the case of division. The software circuit area calculates a suitable correction factor Kf. The value X is multiplied by the correction factor Kf.

21 Claims, 3 Drawing Sheets

METHOD AND APPARATUS FOR PERFORMING A MULTIPLICATION OR DIVISION OPERATION IN AN ELECTRONIC CIRCUIT

REFERENCE TO RELATED APPLICATIONS

This application claims the benefit of the priority date of German application DE 10 2004 060 185.2, filed on Dec. 14, 2004, the contents of which are herein incorporated by reference in their entirety.

FIELD OF INVENTION

The invention relates to a method and an apparatus for performing a multiplication or division operation in an electronic circuit. In particular, the invention relates to a circuit for performing an SINR (Signal-to-Interference and Noise Ratio) estimation in a mobile radio receiver.

BACKGROUND OF THE INVENTION

Multiplication or division operations need to be executed in large numbers in modern chip-based systems (known as System-on-Chip, SoC). It is therefore of great significance to implement these operations with as little complexity as possible in such systems. In this context, it should be remembered that the processing of signals in such chip-based systems often encounters various signal-processing phases and is performed in different circuit areas. Typically, an analogue signal-processing phase is followed by a digital signal-processing phase, and the digital signal processing can be divided further into hardware-based and software-based functionality implementations.

Analogue signal processing is inherently implemented by analogue circuits. By way of example, a terminal in a wireless communication system receives the transmitted signal via an antenna, the said signal being transferred to baseband in the "radio-frequency front end" using analogue circuits and being subjected to analogue/digital conversion. The subsequent digital signal-processing then initially includes data demodulation and decoding, which is often implemented largely on a hardware basis for reasons of efficiency. Subsequent signal-processing phases are then usually programmed on a digital signal processor (DSP) or on a microcontroller (i.e. in a firmware or software implementation, since this form of implementation is more efficient and/or more flexible than hardware implementation.

The text below considers only the digital signal-processing area of chip-based systems. A fundamental design problem is finding a functionality implementation which meets the critical demands on power consumption and chip area requirement as well as possible. A crucial factor in this context is whether a prescribed functionality is implemented in hardware or software/firmware or on a distributed basis.

Hardware-based multiplication operations or division operations using real numbers arise, by way of example, when normalizing hardware-implemented accumulation operations of summands in different quantities. The real numbers (multiplier or divisor) are dependent on the quantity of the accumulated summands and vary in a time interval which is known a priori. By way of example, in the case of UMTS (Universal Mobile Telecommunications System), the variable data rates demanded in the UMTS specification mean that some parts of the receiver are faced with the difficulty that accumulation operations produce a greatly varying quantity of summands, which gives rise to the need to normalize the accumulation results using variable normalization factors.

FIG. 1 shows a conventional implementation for performing normalization operations using a variable normalization factor 1/K. In this case K is an integer. The circuit is implemented in hardware ("hardware area") and firmware ("firmware area"). A preceding hardware block 1 provides data values $a_k$ from a data stream. k denotes the discrete time. This data stream $a_k$ is supplied to a hardware circuit 2 for the purpose of averaging. The hardware circuit 2 calculates the mean value $$b = \frac{1}{K}\sum_{k=1}^{K} a_k.$$

For this, an accumulator 3 is used to accumulate (sum) the desired number of K data values $a_k$. The sum $$\sum_{k=1}^{K} a_k$$

has a word length $B_a$. It is supplied to a multiplication unit 4 having the required word length $B_a$. The other multiplier (normalization factor 1/K) is calculated partly in firmware and partly in hardware. Inversion 5 in firmware is used to ascertain the multiplier 1/K from the number K. This multiplier 1/K has a maximum word length $B_k$. It is transferred to the hardware area via a bus 6 of word length $B_k$ and is stored in a register 7 there. The multiplier 4 accesses the register 7 and calculates the value b.

The value b has a maximum word length $B_p$. Since the numbers are in fixed-point notation, a scaler 8 typically performs subsequent word length reduction from $B_p$ to $B_b$ ($B_p > B_b$). The scaled mean value b is then transferred to a subsequent hardware block 9.

The circuit shown in FIG. 1 has the following drawbacks:

The register 7 for storing the multiplier (in this case 1/K) and the multiplication unit 4 need to be designed for the respective maximum word lengths $B_k$.

The firmware/hardware transfer of the multiplier (in this case 1/K) via the bus 6 needs to be designed for the maximum word length of the multiplier and its maximum frequency of change. For small values of K, the frequency of change may be in the order of magnitude of the data rate of the data stream $a_k$, that is to say very large.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention includes a method for performing a multiplication or division operation in an electronic circuit which allows this operation to be performed with less complexity. In particular, it is intended to permit lower power consumption and a hardware saving. The invention also includes an apparatus for performing a multiplication or division operation in an electronic circuit, particularly in a circuit for performing an SINR estimation which has the aforementioned advantages.

A method in accordance with one aspect involves performing a multiplication or division operation X·k or X·1/K in an electric circuit which comprises a software circuit area and a hardware circuit area. X and K are real numbers in a numerical representation to the base p. The inventive method first of all involves the software circuit area calculating a digit shift sv from the value K such that $p^{sv}$ is an approximate value for K. Next, the value X is shifted sv digits to the left in the case of multiplication or sv digits to the right in the case of division in the hardware circuit area. The software circuit area calculates a suitable correction factor Kf. The shifted value of X is multiplied by the correction factor Kf.

As a result of a digit shift for the value X being performed instead of multiplying the value X by the value K or 1/K, the complex multiplication operation is dispensed with in the hardware circuit area. The shift in the value X which takes place instead can be performed much more efficiently (lower area and power requirement) in the hardware circuit area. The multiplication of the shifted value of X by a suitable correction factor Kf which additionally takes place in comparison with the prior art means additional complexity, but this is low in comparison with the saving achieved over the prior art.

The quantity of possible values of sv is much smaller than the quantity of possible values of K. This means that the value sv normally has a smaller dynamic range (frequency of change) than the value K. The result of this is that the update rate of the digit shift operation is normally much lower than the update rate of the multiplication operation in the prior art. This leads to a reduced bus load (lower power consumption) when transferring the value sv from the software circuit area to the hardware circuit area in comparison with the prior art (see FIG. 1).

Since the digit shift sv is scaled logarithmically (base p) with respect to K and can assume only integers, the required word length for representing the digit shift sv (i.e. for controlling the digit shift operation) is significantly shorter than the word length of the value K or 1/K for representing multiplication in the prior art (see FIG. 1). This likewise reduces the bus load for transferring the value sv from the software circuit area to the hardware circuit area, because in comparison with the prior art (FIG. 1) a bus of significantly reduced word length can be used.

One aspect of the invention is characterized in that the value sv equals round($\log_p K$), where round(·) is the rounding operation (rounding of the argument to the nearest integer). This rule is one example of a possible way of ascertaining a digit shift sv. The approximate value K' for the multiplication, which has been determined by the digit shift, is in this case $K' = p^{round(\log_p K)}$.

The correction factor Kf should be chosen such that the subsequent hardware blocks do not have to be adjusted to the inventive performance of the multiplication or division operation. If a linear response from the subsequent hardware blocks can be assumed, one aspect of the invention can be characterized in that the correction factor Kf has the value ($p^{sv}$)/K in the case of division or the value K/$p^{sv}$ in the case of multiplication. If the subsequent hardware circuit blocks exhibit a nonlinear response, the correction factor Kf can be changed accordingly.

Another aspect of the invention is characterized in that the shifted value X is saturated if it has reached a predefined numerical value. This prevents signal overflows, and least significant bits (LSBs) which are not required from the point of view of accuracy are rejected through quantization.

An electronic circuit based on the invention for performing a multiplication or division operation X·K or K·1/K has a first calculation means in the software circuit area for calculating a digit shift sv such that $p^{sv}$ is an approximate value for K. In addition, the electronic circuit comprises a controllable digit shifter (barrel shifter), contained in the hardware circuit area of the electronic circuit, for shifting the value X through sv digits to the left in the case of multiplication or sv digits to the right in the case of division. The software circuit area also comprises second calculation means for calculating a suitable correction factor Kf, and means for multiplying the shifted value of X by the correction factor Kf.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below using exemplary embodiments with reference to the drawings, in which.

DETAILED DESCRIPTION OF THE INVENTION

Figure 1:
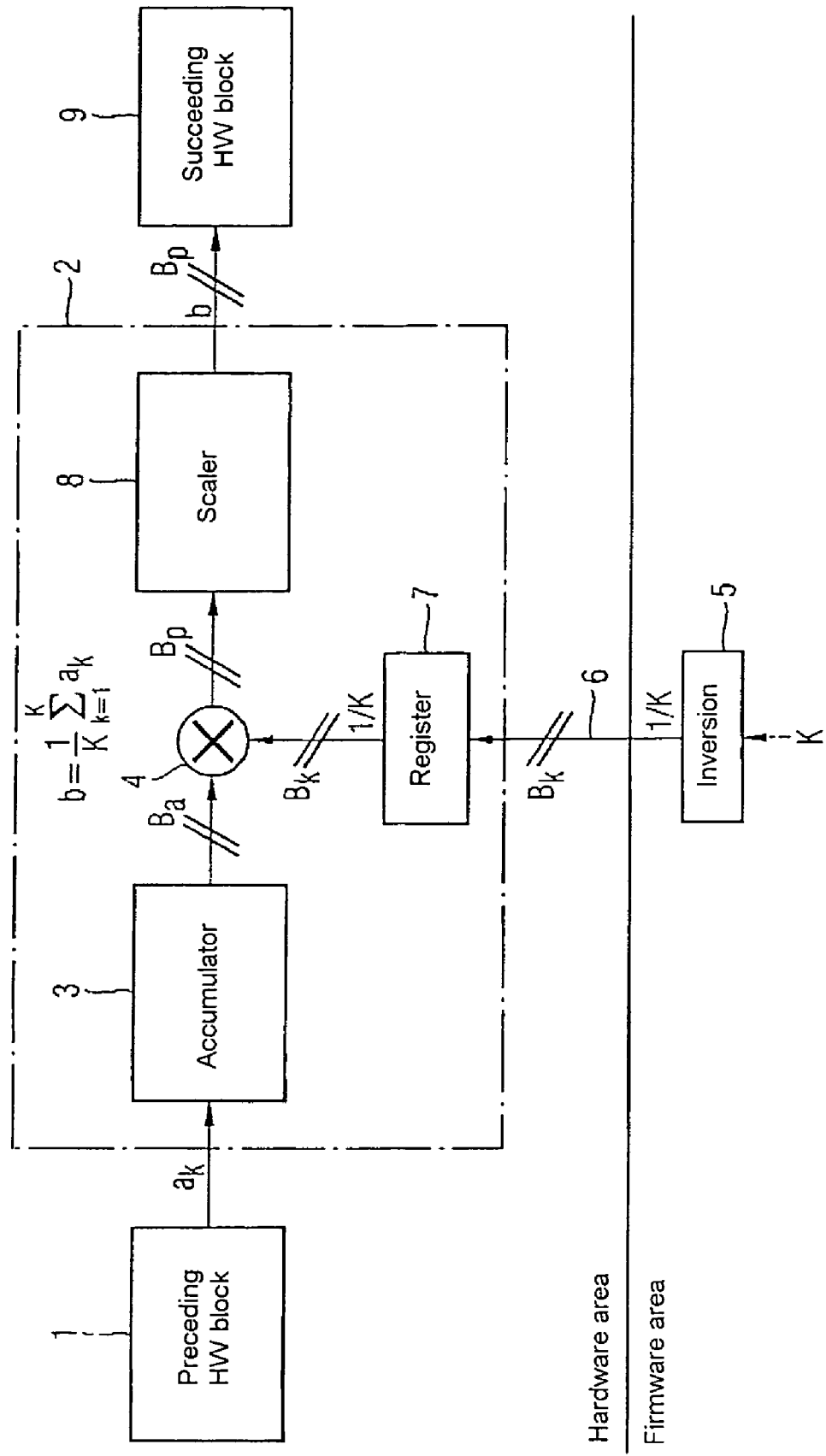
FIG. 1 shows a conventional implementation of a circuit for performing a division operation.

The present invention will now be described with reference to the attached drawings, wherein like reference numerals are used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

Figure 2:
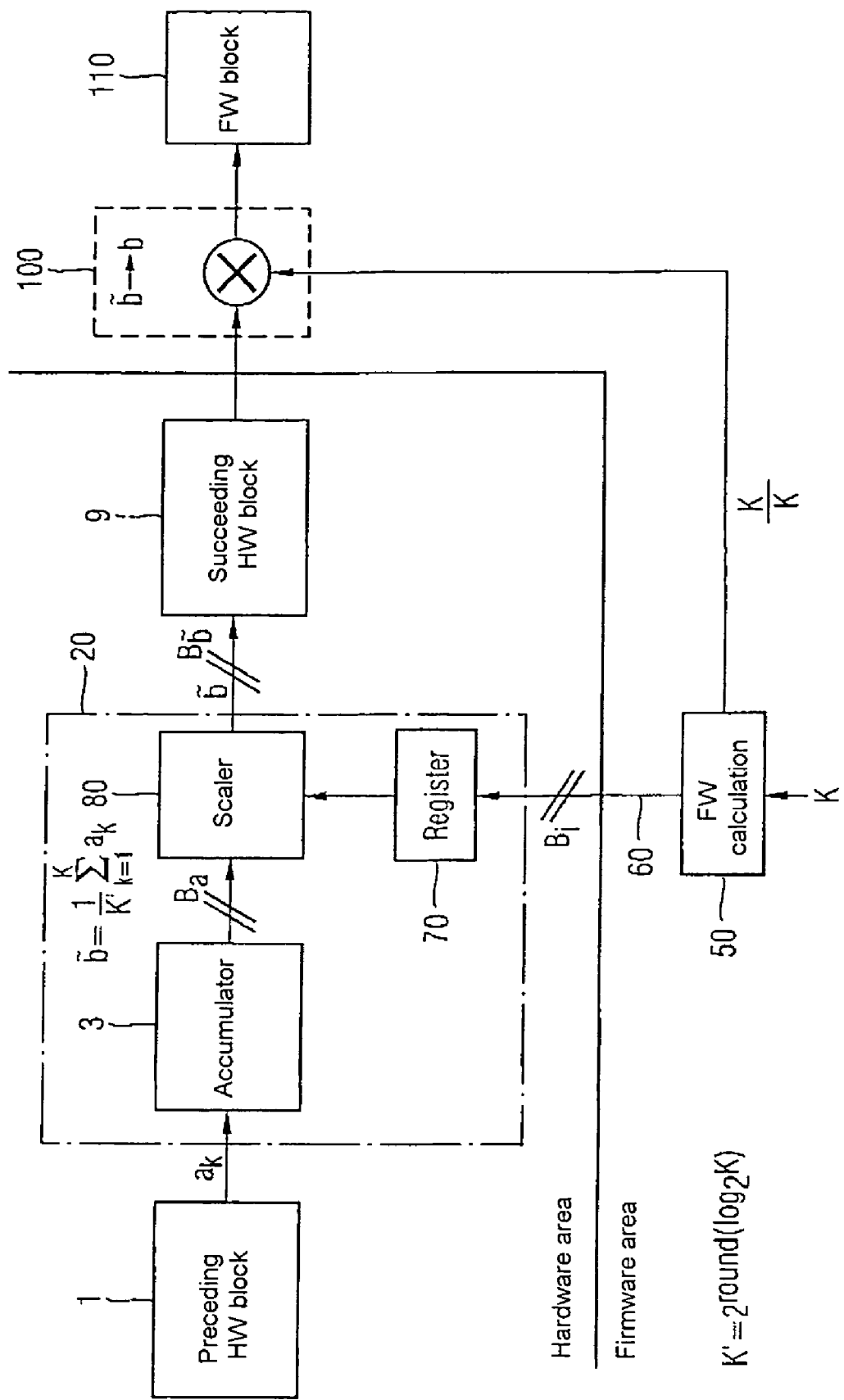
FIG. 2 shows an exemplary embodiment of the invention for implementing an inventive circuit for performing a division operation.

FIG. 2 shows an exemplary embodiment of an inventive circuit for performing division by K (or multiplication by the factor 1/K). Circuit elements which are the same as or similar to those in FIG. 1 are denoted by the same reference symbols. A hardware circuit for approximative averaging 20 which is connected downstream of the preceding hardware block 1 has the accumulator 3, a controllable scaler or barrel shifter 80 and a register 70. The output of the accumulator 3 has a word length $B_a$ and is connected to the data input of the scaler 80. The control input of the scaler 80 is connected to the output of the register 70. The output of the scaler 80 leaves the hardware circuit 20 and is supplied to a downstream hardware block 9, which may be identical to the hardware block 9 in FIG. 1.

The firmware area comprises a firmware calculation block 50 for calculating a digit shift sv. The digit shift sv is transmitted to the hardware area via a bus 60 and is stored in the register 70. The firmware calculation block 50 also ascertains a correction factor $2^{sv}/K$ in the form $2^{round(log_2 K)}/K$. This is transmitted to a firmware correction block 100 which processes the output data from the hardware block 9. The data stream corrected in this manner is processed further in a firmware block 110.

The way in which the inventive circuit works is as follows:

The incoming data stream $a_k$ has a known, possibly variable, data rate. Accumulation needs to be performed of $a_k$ data values, and appropriate normalization operations need to be performed using the normalization factor $1/K$, i.e. the value $$b = \frac{1}{K}\sum_{k=1}^{k} a_k$$

needs to be calculated. The value K is variable and may vary over a wide range of values.

The value K known in the firmware area is communicated (in a manner which is not shown) to the accumulator 3 and is made available to the firmware calculation block 50. The accumulator 3 calculates the sum $$\sum_{k=1}^{K} a_k.$$

The firmware calculation block 50 ascertains sv, e.g. $sv = round(log_2 K)$, from the value K. The value sv has a word length (bit length) $B_i$ and is written to the register 70 in the hardware area via a bus 60.

The sum $$\sum_{k=1}^{K} a_k$$

has the word length $B_a$. The digit shift sv is used by the parameterizable scaler 80 to select the bits for the shift operation applied to the sum $$\sum_{k=1}^{K} a_k.$$

The approximated value $$\bar{b} = \frac{1}{2^{sv}}\sum_{k=1}^{K} a_k$$

produced by the shift operation has the word length $B_{\bar{b}}$. Since $2^{sv}/K < 2$ is true, the word length $B_{\bar{b}}$ is identical to the word length $B_b$ of the correct value b, i.e. $B_{\bar{b}} = B_b$.

In other words, the sum $$\sum_{k=1}^{K} a_k$$

is multiplied in the hardware circuit 20 not by the correction factor $1/K$ itself but rather by an approximate value $\frac{1}{2^{sv}}$.

The error added as a result is compensated for by the correction factor Kf ascertained in the firmware calculation block 50.

If the hardware block 9 exhibits a linear response, the correction factor $Kf = 2^{sv}/K$. For $sv = round(log_2 K)$, the result is $Kf = 2^{round(log_2 K)}/K$. The effect of the compensation multiplication in the firmware correction block 100 is that the subsequent data processing (firmware block 110) can continue to operate with the exact value b.

The compensation multiplication with the correction factor $Kf = 2^{sv}/K$ thus assumes a linear response from the downstream hardware block 9. If the response from the downstream hardware block 9 is not linear, it is necessary to perform appropriately adjusted compensation multiplication. In all cases, the data processing blocks situated in the signal route downstream of the firmware correction block 100 (firmware block 110 and/or hardware blocks which were not shown) are not affected by this change. As already mentioned, the hardware block 9 is also identical to the hardware block 9 used in the prior art.

The inventive solution has the following advantages:

The required word length for representing the shift operation $B_i$ is normally much shorter than the word length of the factor itself, i.e. $B_i \ll B_k$.

The update rate of the shift operation may turn out to be lower than that of the multiplier (normalization factor $1/K$) in the prior art, since the rounded value $2^{round(log_2 K)}$ of K has a smaller dynamic range than K. This and the previous point result in a reduced bus load on the bus 60 (compared with the bus 6).

The multiplication unit 4 required in the prior art is dispensed with, and the scaler 80 becomes somewhat more complicated than the scaler 8 in the prior art. The result of this is significantly less complex hardware.

One slight drawback to the inventive solution can be seen in the necessary firmware mapping of the value K on to the shift operation (digit shift sv) and on to the correction factor Kf. However, the complexity for this is comparable to the mapping (inversion) of K on to $1/K$ which needs to be performed in FIG. 1.

In addition, it can be said that the inventive concept can be used particularly efficiently when a plurality of such multiplication operations or division operations are performed using the same factors (K and $1/K$) in the hardware area. In that case, all operations can be corrected with the same firmware correction multiplication in the firmware correction block 100. This also becomes clear from the exemplary embodiment below.

Figure 3:
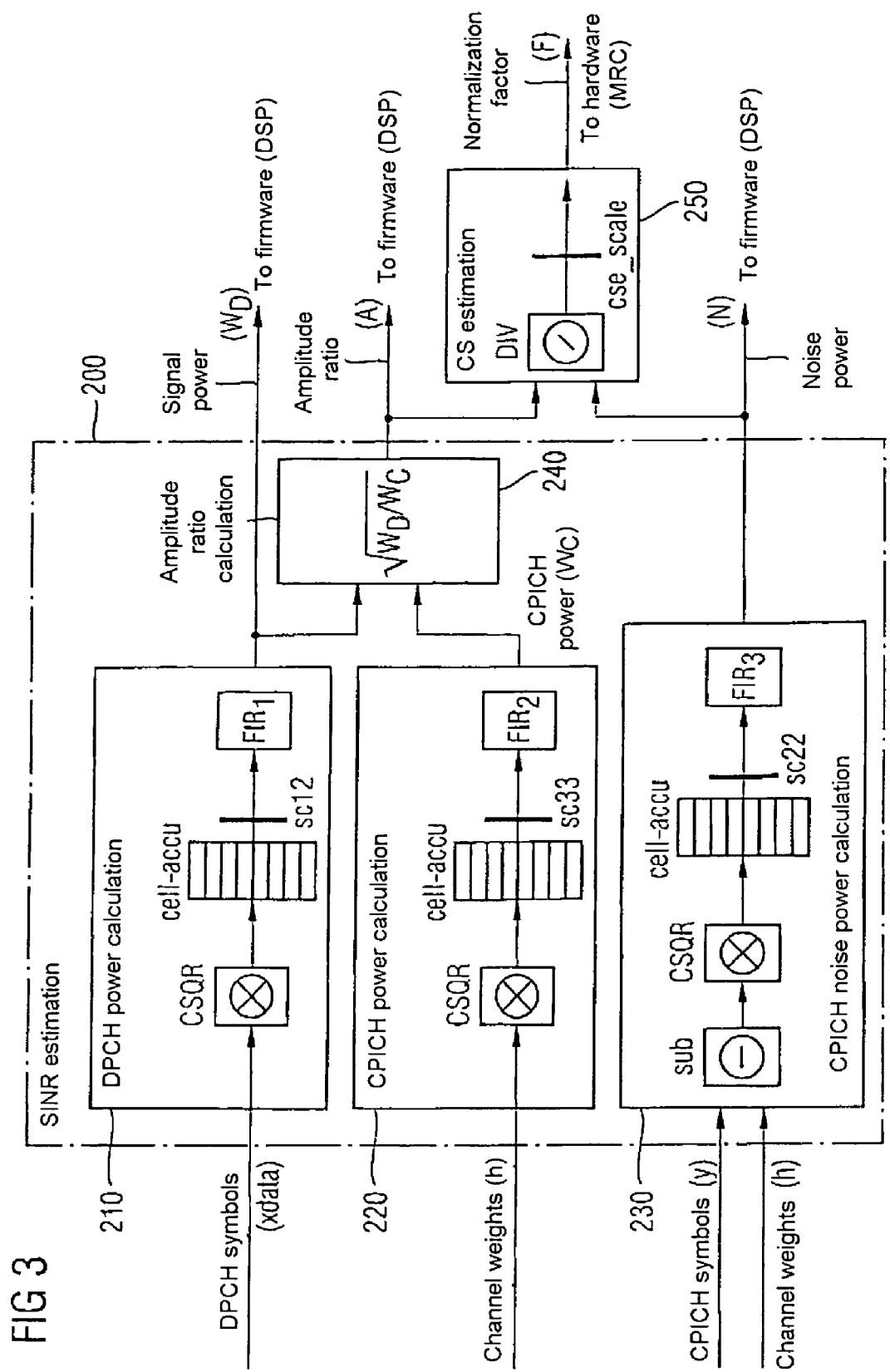
FIG. 3 shows an exemplary embodiment of a circuit for performing signal-to-interference and noise estimation, which provides for multiple use of a circuit based on the invention.

FIG. 3 uses an example to show the application of the invention in the circuit blocks SINR (Signal-to-Interference and Noise Ratio) estimation 200 and CS (Channel State) estimation 250 on the MGOLD2™ chip from Infineon Technologies AG. To provide a better understanding of the aspects which are fundamental to the invention, the circuit blocks SINR estimation 200 and CS estimation 250 are shown in simplified form (just for the operating mode "normal mode, data-based").

The hardware block SINR estimation 200 is made up of four subblocks DPCH power calculation 210, CPICH power calculation 220, CPICH noise power calculation 230 and a unit for calculating the amplitude ratio 240. The hardware block SINR estimation 200 has the block 250 for estimating the channel state connected downstream of it.

The SINR estimation is based in UMTS on the received complex-value symbols for the physical channels DPCH (Dedicated Physical Channel) and CPICH (Common Pilot Channel). The channel structure of UMTS is known and indicated, by way of example, in the specification 3GPP TS 25.211 V4.6.0 (2002-09) (Release 4).

The output of the subblock 210 for the DPCH power calculation is supplied both to the firmware area and to the subblock 240 for calculating the amplitude ratio. The output of the subblock 220 for CPICH power calculation is supplied to the subblock 240 for calculating the amplitude ratio. The latter's output is routed both to the firmware area and to an input of the block 250 for the channel state estimation. The output of the subblock 230 is supplied to the other input of the block 250 for the channel state estimation and to the firmware area. The firmware area may be implemented by a DSP, for example.

The text below provides a more detailed explanation of the design and manner of operation of the individual subblocks 210, 220, 230, 240 and of the block 250.

The input signals for the subblocks 210, 220, 230 are formed from the despread and delay-compensated DPCH symbols xdata, CPICH symbols y and the CPICH channel weights h. The CPICH channel weights h can be imagined to be low-pass-filtered, despread and delay-compensated CPICH symbols y. All the input signals are complex-value signals and are applied for all the propagation paths (rake fingers) processed in parallel in the UMTS receiver, with the upstream delay compensation already compensating for the time shifts through the path-specific propagation routes. The input signal components received via various propagation paths can therefore be considered to be synchronous in time.

The subblock 210 for the DPCH power calculation has a complex squarer CSQR and a multichannel accumulator cell-accu. Provided at the output of the multichannel accumulator cell-accu is a controllable scaler (barrel shifter) sc12. The controllable scaler sc12 has an FIR filter $FIR_1$ connected downstream of it.

The subblock 210 for the DPCH power calculation calculates the signal power $W_D$ on the basis of the following equation:

$$W_D(C)=FIR_1((1/K_X)\cdot \Sigma_{m=1\ldots M(C)}\Sigma_{k=1\ldots K_X}|xdata_m(k)|^2). \quad (1)$$

In this case, m denotes the finger number and k denotes the time index. C is the cell number, M(C) is the number of rake fingers in cell C. $xdata_m(k)$ denotes the k-th data symbol (k=1, ..., $K_X$) in the timeslot of rake finger m. $K_X$ denotes the quantity of symbols in a timeslot.

Accordingly, the subblock 210 for the DPCH power calculation squares the absolute values of the complex DPCH data symbols $xdata_m(k)$ in the complex squarer CSQR. The absolute-value squares over all the symbols in a timeslot (k=1, ..., $K_X$) and all the rake fingers in a cell (m=1, ..., M(C)) are summed in the accumulator cell-accu. For each cell, one result value is obtained per UMTS timeslot. These cell-specific result values are subjected to normalization of scaling with the reciprocal of the quantity of symbols per timeslot, $1/K_X$, using the controllable scaler sc12. $K_X$ can also change when the spread factor is changed at the timeslot boundaries. The normalized result obtained for each cell is then subjected to low-pass filtering in the $FIR_1$ filter. $W_n(C)$ indicates the DPCH power of the cell with the cell number C.

The subblock 220 for the CPICH power calculation is of similar design to the subblock 210. The scaler in the subblock 220 is denoted by the reference symbol sc33. Instead of the data symbols $xdata_m(k)$, the channel weights $h_m(k)$ are processed where $h_m(k)$ denotes the k-th channel weight (k=1, ..., 10) of the rake finger m. There are constantly 10 channel weights per timeslot. The scaling is therefore effected constantly using a factor 1/10. The equation for the calculation of the CPICH power is accordingly:

$$W_C(C)=FIR_2((1/10)\cdot \Sigma_{m=1\ldots M(C)}\Sigma_{k=1\ldots 10}|h_m(k)|^2) \quad (2)$$

In this case, $W_C(C)$ denotes the CPICH signal power in the cell with the cell number C.

The subblock 230 for the CPICH noise power calculation is of similar design to the subblocks 210 and 220. It additionally has a subtractor sub at the input. $y_m(k)$ denotes the k-th CPICH symbol (k=1, ..., 10) of the rake finger m. The subtractor sub forms the difference $y_m(k)-h_m(k)$. This difference can be regarded as an estimated noise signal from the CPICH, because it is formed by deducting the low-pass-filtered CPICH signal from the original CPICH signal. These estimated current complex noise amplitudes, $y_m(k)-h_m(k)$, have their absolute values squared in the complex squarer CSQR, are summed in the accumulator cell-accu, are scaled by the scaler sc22 and are filtered by means of the FIR filter $FIR_3$. The noise power N(C) obtained for the cell with the cell number C is:

$$N(C)=FIR_3((1/(10\cdot M(C)))\cdot \Sigma_{m=1\ldots M(C)}\Sigma_{k=1\ldots 10}|y_m(k)-h_m(k)|^2) \quad (3)$$

From the equation above, it becomes clear that, unlike in the two preceding algorithms (equations (1) and (2)), equation (3) involves not just division by the quantity of CPICH symbols per timeslot, i.e. by 10, but rather additionally division by the quantity of fingers in the cell, M(C). The quantity M(C) may be different for each cell and may change from timeslot to timeslot.

All the FIR filters $FIR_1$, $FIR_2$, $FIR_3$ have a low-pass response with the gain 1 at the frequency 0 Hz. This means that they can be disregarded when considering the scaling factors. The coefficients of the three FIR filters $FIR_1$, $FIR_2$, $FIR_3$ may be different, which is indicated by the different indices 1, 2, 3.

The subblock 240 for the calculation of the amplitude ratio divides the estimated DPCH signal power $W_D(C)$ by the estimated CPICH power $W_C(C)$ and calculates the root of this ratio. The variable A(C) thus obtained is called the amplitude ratio. For each timeslot, a value is calculated for each cell (cell number C):

$$A(C)=\sqrt{W_D(C)/W_C(C)} \quad (4)$$

The block 250 for the channel state estimation comprises a division stage DIV and a scaler sce_scale. The divider DIV divides the amplitude ratio A(C) by the noise power N(C). The result of the division is the normalization factor F(C), which is required by the MRC (Maximum Ratio Combiner) hardware unit (not shown in FIG. 3) which forms the combiner of the rake receiver. The normalization factor F(C) is calculated for each timeslot and each cell as follows:

$$F(C)=A(C)/N(C) \quad (5).$$

The results from the hardware block 200 for the SINR estimation and from the block 250 for the channel state estimation are also required for further processing in the DSP (firmware area), apart from the MRC. The firmware area divides the signal power ascertained in the hardware, for example by the noise power and forms the common logarithm therefrom, which results in a cell-specific estimate for the signal-to-interference and noise power ratio SINR in decibels (dB).

It will also be pointed out that the signal-processing algorithms indicated in equations (1) to (5) are examples, since they apply only to one particular operating mode (normal mode, data-based) and may be different in other operating modes.

From the previous statements, it becomes clear that the task of the hardware blocks shown in FIG. 3 is to pre-process the input signals using relatively simple mathematical operations which, however, result in a significant data reduction. The effect achieved by this is that the further processing of the result data in the DSP requires only few, but therefore more complex, mathematical operations to be performed. These can easily be programmed in firmware.

On the basis of the invention, it has been recognized that it would be inefficient to implement the "ideal" algorithms based on equations (1) to (5) directly in hardware, because the scaling operations require division operations by numbers which are not powers of two. Divisions by 10 or by a variable quantity of symbols or rake fingers, as arise in equations (1) to (5), are much easier to perform in firmware than in hardware. For this reason, the hardware performs only divisions by powers of two, i.e. shift register operations. Divisions by arbitrary positive integers, Z, are replaced by divisions by the "nearest" power of two, $2^{round(log_2(Z))}$. Instead of dividing by 10, there is thus a 3-bit shift to the right, which is equivalent to dividing by 8. The results $W_D(C)$, $A(C)$, $N(C)$ are forwarded incorrectly to the DSP (firmware area). The approximation error is corrected in the firmware (by the DSP), where divisions by arbitrary numbers are much easier to perform than in hardware. The correction factor by which the results from the hardware need to be multiplied in the firmware is $2^{round(log_2(Z))}/Z$, that is to say is the same as the quotient of the approximated and actual denominator expression.

In this respect, the scalers sc12, sc22, sc33 are essentially barrel shifters, that is to say hardware units which can shift a programmable quantity of bits to the right (or left) and thus approximate the scaling factors in equations (1) and (3). The quantity of bits through which a shift is necessary corresponds to the variable sv (digit shift) shown in FIG. 2.

Besides for the shift operations, the scalers sc12, sc22, sc33 are also used to saturate the signal when defined threshold values are reached, in order to prevent signal overflows and in order to reject LSBs which are not required from the point of view of accuracy through quantization.

In contrast to the scalers sc12, sc22, sc33, the scaler cse_scale in the block 250 for the channel state estimation is of conventional design, i.e. in the form of a hardware multiplier as shown in FIG. 1. The reason for this is that the normalization factor F(C) is required directly in the hardware, and division in firmware would require too much time in this case (hardware-firmware-hardware loop). For this reason, the firmware calculates the correction factor, which is obtained from the product of all the approximation errors in the scaling factors in the scalers sc12, sc22, sc33. This value is generally not a power of two. The scaler cse_scale therefore requires a hardware multiplication unit in order to multiply the data signal which the divider DIV outputs by a scaling factor which is calculated by the DSP and which is programmed into a register (not shown).

Both in the circuit in FIG. 2 and in the circuit in FIG. 3, the correction factor Kf is thus calculated in firmware. The difference between the two circuit arrangements is that in FIG. 2 the correction block 100 is produced in firmware, whereas in FIG. 3, for one of the calculated variables, F(C), the correction block is represented by the scaler cse_scale, i.e. is produced in hardware.

To provide a better understanding of the invention, this is illustrated using a simple numerical example: the DPCH timeslot format (slot format) 15 is assumed. In accordance with the UMTS standard 3GPP TS 25.211 (2002-09) indicated at the outset, there are in this case $K_x$=304 data symbols in the timeslot. A cell with 7 rake fingers to demodulating propagation paths is taken as a basis, i.e. M(C)=7. To program the scaler sc12, the nearest power of two to 304 is calculated, that is to say is $2^{round(log_2(304))}=2^{round(8.2479...)}=2^8=256$. The scaler sc12 therefore multiplies by the factor 1/256. To actuate the scaler sc12, only the number of bit shifts (that is to say the number 8) is programmed into the scaling parameter register (corresponds to the register 70 in FIG. 2). This requires a much shorter bit length for the numerical representation in comparison with the number 256, i.e. $B_i<<B_k$ in FIG. 2.

The approximation error in the subblock 210 for the DPCH power calculation is therefore a factor 304/256, i.e. the results are too great by this factor.

The approximation error in the subblock 220 for the CPICH power calculation is a factor 10/8, since the scaler sc33 divides only by 8 instead of by 10.

The approximation error in the subblock 230 for the CPICH noise power calculation with the scaler sc22 produces a factor 70/64 (since 10·M(C)=10·7=70 is replaced by 64). This results in the following correction factors:

Correction factor for the signal power (subblock 210):

$Kf_1$=256/304=0.84210 . . . .

Correction factor for the noise power (subblock 230):

$Kf_2$=64/70=0.91428 . . . .

Correction factor for the amplitude ratio (subblock 240):

$Kf_3$=sqrt((256/304)/(8/10))=1.02597 . . . .

It is therefore necessary to use the following correction factor for calculating the normalization factor in the block 250:

$Kf_4$=sqrt((256/304)/(8/10))/(64/70)=1.12216 . . . .

The multiplication operations using the first three correction factors $Kf_1$, $Kf_2$, $Kf_3$ for the output variables $W_D(C)$, N(C), A(C) are performed purely in firmware (using the DSP, which corresponds to the software correction block 100 in FIG. 2), and the multiplication by the last correction factor $Kf_4$ is performed, as already mentioned, in hardware by the scaler cse_scale. However, the correction factor $Kf_4$ as such is calculated in firmware and is programmed as a parameter using a register (not shown) in the hardware block 250.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, the term "exemplary" as utilized herein merely means an example, rather than the best.

What is claimed is:

1. A method for calculating a final value, which depends on the result of a multiplication operation X·K or a division operation X/K, wherein X and K are real numbers in a numerical representation to a base p, comprising:
    calculating a digit shift sv in a software circuit area of an electronic circuit wherein $p^{sv}$ is an approximate value for shifting X to the left by the digit shift sv for multiplication or to the right by the digit shift sv for division within a hardware circuit area of the electronic circuit to obtain a shifted value of X;
    processing the shifted value of X in a hardware block to obtain a value derived from the shifted value of X;
    calculating a correction factor Kf in the software circuit area on the basis of K and $p^{sv}$; and
    multiplying the value derived from the shifted value of X by the correction factor Kf to obtain the final value.

2. The method of claim 1, wherein the digit shift sv equals round($\log_p$ K).

3. The method of claim 1, wherein the correction factor Kf is about equal to ($p^{sv}$)/K for division and K/$p^{sv}$ for multiplication.

4. The method of claim 1, wherein X changes at a greater rate than K.

5. The method of claim 1, wherein multiplying the value derived from the shifted value of X by the correction factor Kf is performed in the software circuit area.

6. The method of claim 1, further comprising saturating the shifted value of X according to a defined threshold value to prevent overflows and reject unnecessary least significant bits.

7. The method of claim 1, wherein shifting X is performed by a barrel shifter.

8. The method of claim 1, wherein the final value is power of a signal in a mobile radio network.

9. The method of claim 1, wherein p equals 2.

10. The method of claim 1, wherein a non-linear operation is used for processing the shifted value of X in the hardware block to obtain the value derived from the shifted value of X.

11. An electronic circuit for calculating a final value, which depends on the result of a multiplication operation X·K or a division operation X/K, wherein X and K are real numbers in a numerical representation to a base p, comprising:
    a software circuit area;
    a hardware circuit area coupled to the software circuit area;
    a first calculation mechanism located in the software circuit area for calculating a digit shift sv wherein $p^{sv}$ is an approximate value for a controllable digit shifter located within the hardware circuit area for shifting X to the left by the digit shift sv for multiplication or to the right by the digit shift sv for division to obtain a shifted value of X;
    a hardware block located within the hardware circuit area for processing the shifted value of X and outputting a value derived from the shifted value of X;
    a second calculation mechanism located within the software circuit area for calculating a correction factor Kf on the basis of K and $p^{sv}$; and
    a multiplication mechanism for multiplying the value derived from the shifted value of X by the correction factor Kf to obtain the final value.

12. The electronic circuit of claim 11, wherein the digit shift sv equals round($\log_p$ K).

13. The electronic circuit of claim 11, wherein the correction factor Kf is about equal to ($p^{sv}$)/K for division and K/$p^{sv}$ for multiplication.

14. The electronic circuit of claim 11, wherein X changes at a greater rate than K.

15. The electronic circuit of claim 11, wherein the multiplication mechanism is located in the software circuit area.

16. The electronic circuit of claim 11, further comprising a saturation stage for saturating the shifted value of X according to a defined threshold value to prevent overflows and reject unnecessary least significant bits.

17. The electronic circuit of claim 11, wherein the controllable digit shifter is a barrel shifter.

18. The electronic circuit of claim 11, wherein the final value is power of a signal in a mobile radio network.

19. The electronic circuit of claim 11, wherein the final value is a DPCH power calculation.

20. The electronic circuit of claim 11, wherein the final value is a noise power calculation.

21. The electronic circuit of claim 11, wherein the hardware block uses a non-linear operation for processing the shifted value of X to obtain the value derived from the shifted value of X.

* * * * *